United States Patent
Carroll et al.

(10) Patent No.: US 8,928,679 B2
(45) Date of Patent: Jan. 6, 2015

(54) WORK DISTRIBUTION FOR HIGHER PRIMITIVE RATES

(75) Inventors: Jason Carroll, Oviedo, FL (US); Vineet Goel, Winter Park, FL (US); Mangesh Nijasure, Orlando, FL (US); Todd E. Martin, Orlando, FL (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 229 days.

(21) Appl. No.: 13/616,474

(22) Filed: Sep. 14, 2012

(65) Prior Publication Data

US 2014/0078156 A1 Mar. 20, 2014

(51) Int. Cl.
| | | |
|---|---|---|
| *G06T 1/00* | (2006.01) | |
| *G06F 15/16* | (2006.01) | |
| *G06F 15/80* | (2006.01) | |
| *G06T 1/20* | (2006.01) | |
| *G06F 17/00* | (2006.01) | |
| *G06T 1/60* | (2006.01) | |

(52) U.S. Cl.
CPC .... *G06T 1/20* (2013.01); *G06T 1/60* (2013.01)
USPC ........... 345/522; 345/502; 345/505; 345/506; 345/418

(58) Field of Classification Search
None
See application file for complete search history.

(56) References Cited

U.S. PATENT DOCUMENTS

| | | | |
|---|---|---|---|
| 2007/0091088 A1* | 4/2007 | Jiao et al. | 345/426 |
| 2007/0146378 A1* | 6/2007 | Sorgard et al. | 345/581 |
| 2008/0150950 A1* | 6/2008 | Sorgard et al. | 345/522 |
| 2011/0080416 A1* | 4/2011 | Duluk et al. | 345/506 |
| 2012/0223947 A1* | 9/2012 | Nystad et al. | 345/426 |
| 2013/0265309 A1* | 10/2013 | Goel et al. | 345/426 |

* cited by examiner

*Primary Examiner* — Maurice L McDowell, Jr.
*Assistant Examiner* — Donna J Ricks
(74) *Attorney, Agent, or Firm* — Volpe and Koenig, P.C.

(57) ABSTRACT

A system, method and a computer program product are provided for distributing prim groups for parallel processing in a single clock cycle. A work distributor divides a draw call for primitive processing into a plurality of prim groups according to a prim group size. The work distributor then distributes the plurality of prim groups to a plurality of shader engines for parallel processing of the plurality of prim groups during a clock cycle. The size of a prim group and a number of prim groups are scaled to the plurality of shader engines.

23 Claims, 6 Drawing Sheets

| Name: | Bits: | Description: |
|---|---|---|
| WD_IA_draw_transfer_type | 3 | 0 – Draw command Major Mode 0<br>1 – Draw command Major Mode 1<br>2 – EVENT_INITIATOR<br>3 – EVENT_ADDRESS<br>4 – State transfer for VGT_MIN_VTX_INDX<br>5 – State transfer for VGT_MAX_VTX_INDX<br>6 – State transfer for VGT_INDX_OFFSET<br>7 – Index transfer for Immediate Data |
| WD_IA_draw_source | 2 | 0 – DMA draw call<br>1 – IMMED_INDX draw call<br>2 – AUTO_INDX draw call<br>3 – DRAW_OPAQ draw call<br>Only valid for transfer_type = MM0 Draw / MM1 Draw |
| WD_IA_draw_num_indices | 32 | Transfer Type : Draw Command – Number of indices in the sub draw call<br>Transfer Type : Event – Carries event information<br>Transfer Type : State data for Min/Max/Offset – Carries register information<br>Transfer Type : Immediate Data – Carries immediate index |
| WD_IA_draw_index_type | 1 | Transfer Type : Draw Command<br>Type of indices being requested<br>0 – 16 bit indices<br>1 – 32 bit indices |
| WD_IA_draw_prim_type | 6 | The primitive type being processed |
| WD_IA_draw_auto_indx_start | 32 | The starting index value for auto index draw calls when the transfer type is a draw call |
| WD_IA_draw_state_sel | 3 | Indicates state select for the draw call |
| WD_IA_draw_primid_base | 32 | This is the primitive id for the first primitive in the sub draw call<br>The IA will enumerate the rest of the primitives based on this |
| WD_IA_draw_eoi | 1 | Indicates end of instance |
| WD_IA_draw_eop | 1 | Indicates end of packet |

FIG. 4

| Name: | Bits: | Description: |
|---|---|---|
| WD_IA_dma_base | 40 | Base address for the sub DMA request |
| WD_IA_dma_size | 32 | Size of the DMA request |
| WD_IA_dma_index_type | 1 | Type of indices being requested<br>0 – 16 bit indices<br>1 – 32 bit indices |
| WD_IA_dma_swap_mode | 2 | Swap mode for the DMA request |
| WD_IA_dma_vmid | 4 | Virtual Memory ID for the DMA fetch |
| WD_IA_dma_priv | 1 | Set if the request is privileged |
| WD_IA_dma_out_of_range | 1 | This bit indicates that this request is for out of bound data. The DMA engine will not issue a fetch to the MC for this request but will internally generate 0x0 for all the indices being requested and feed them to the Grouper |

FIG. 5

WORK DISTRIBUTION FOR HIGHER PRIMITIVE RATES

BACKGROUND

1. Field of the Invention

The invention is generally directed to work distribution in a graphics pipeline. More particularly, the invention is directed to a scalable mechanism for distributing work among multiple primitive blocks in a graphics pipeline.

2. Background Art

Display images comprise thousands of dots, where each dot represents one of thousands or millions of colors. These dots are known as picture elements, or "pixels". Each pixel has multiple attributes associated with it, such as, color and texture attributes. Those attributes are manipulated and processed before being rendered on a display screen of an electronic device.

Pixels form graphical objects. Example graphical objects include points, lines, polygons, and three-dimensional (3D) solid objects. Points, lines, and polygons represent rendering primitives which are the basis for most rendering instructions. More complex structures, such as 3D objects, are formed from a combination or a mesh of such primitives. To display a particular scene, the visible primitives associated with the scene are drawn individually by determining pixels that fall within the edges of the primitives, and obtaining the attributes of the primitives that correspond to each of those pixels.

Because there are thousands, if not millions of primitives, the inefficient processing of primitives reduces system performance when rendering complex images on a display screen. Conventional graphics systems process primitives serially or in a limited parallel way that cannot be scaled or expanded.

BRIEF SUMMARY OF EMBODIMENTS

Therefore, what is needed are scalable systems and methods where primitives can be distributed to multiple shader engines for parallel processing and efficient rendering of an image on a display screen.

A system, method and a computer program product are provided for distributing prim groups (i.e., groups of primitives) for parallel processing in a single clock cycle. A work distributor divides a draw call for primitive processing into a plurality of prim groups according to a prim group size. The work distributor then distributes the plurality of prim groups to a plurality of shader engines for parallel processing of the plurality of prim groups during a clock cycle. The size of a prim group and a number of prim groups are scaled to the plurality of shader engines.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

FIG. 4 is an exemplary interface for processing a draw command workgroup.

FIG. 5 an exemplary interface for processing a DMA request workgroup.

Figure 6:
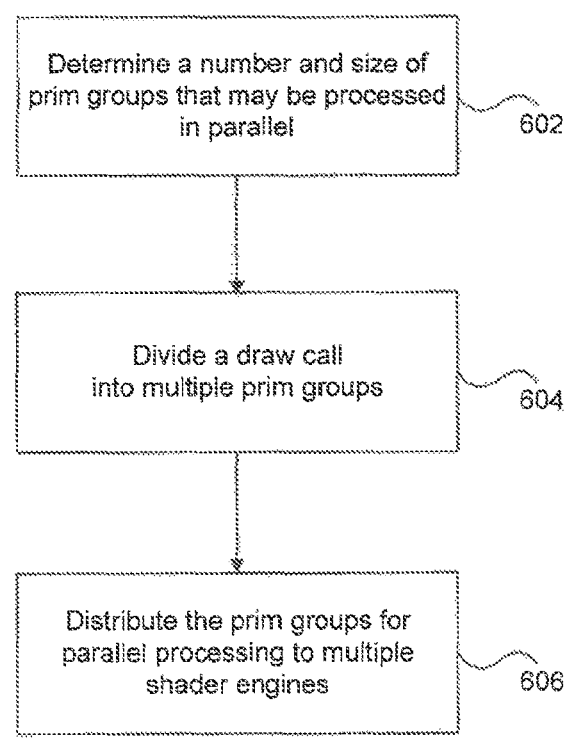

FIG. 6 is a flowchart of a method for processing draw calls, according to an embodiment.

The invention will be described with reference to the accompanying drawings. Generally, the drawing in which an element first appears is typically indicated by the leftmost digit(s) in the corresponding reference number.

DETAILED DESCRIPTION OF EMBODIMENTS OF THE INVENTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a," "an" and "the" are intended to include the plural forms as well, unless the context clearly indicates otherwise. It will be farther understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

A graphics pipeline is included in a graphics processing unit (also referred to as a GPU, but which may be included in other types of processors). A GPU is a specialized electronic circuit designed to rapidly build and render images on an electronic device, amongst other operations. A GPU is used to process graphics on electronic devices such mobile phones, personal computers, workstations, game consoles, as well as within embedded systems on the electronic devices. A GPU has a highly parallel structure that is efficient for processing large blocks of data, such as data included in computer graphics applications, images and videos, in parallel. Mathematical data, particularly matrix data, also benefits from GPU processing because many matrix manipulations are performed in parallel.

To process data efficiently, GPUs include hardware pipelines. Hardware pipelines are dedicated to processing data of a particular type or perform a particular type of a function. A graphics pipeline is dedicated to process and render computer graphics, images, video, etc. As described above, each image or a frame in a video is rendered using primitives that include points, lines, polygons or a combination of primitives that are organized into a mesh. The primitives in each frame or image are drawn individually by determining which pixels fall within the edges of the primitives and calculating the attributes of the primitive that corresponds to each of those pixels.

Some graphics pipelines process primitives in a sequential manner. Other graphics pipelines process two primitives in a single clock cycle and cannot be scaled to process more primitives in parallel. This drawback in primitive processing significantly slows the rendering of an image in the graphics pipeline and is a bottleneck that affects efficient image rendering on an electronic device.

Figure 1:
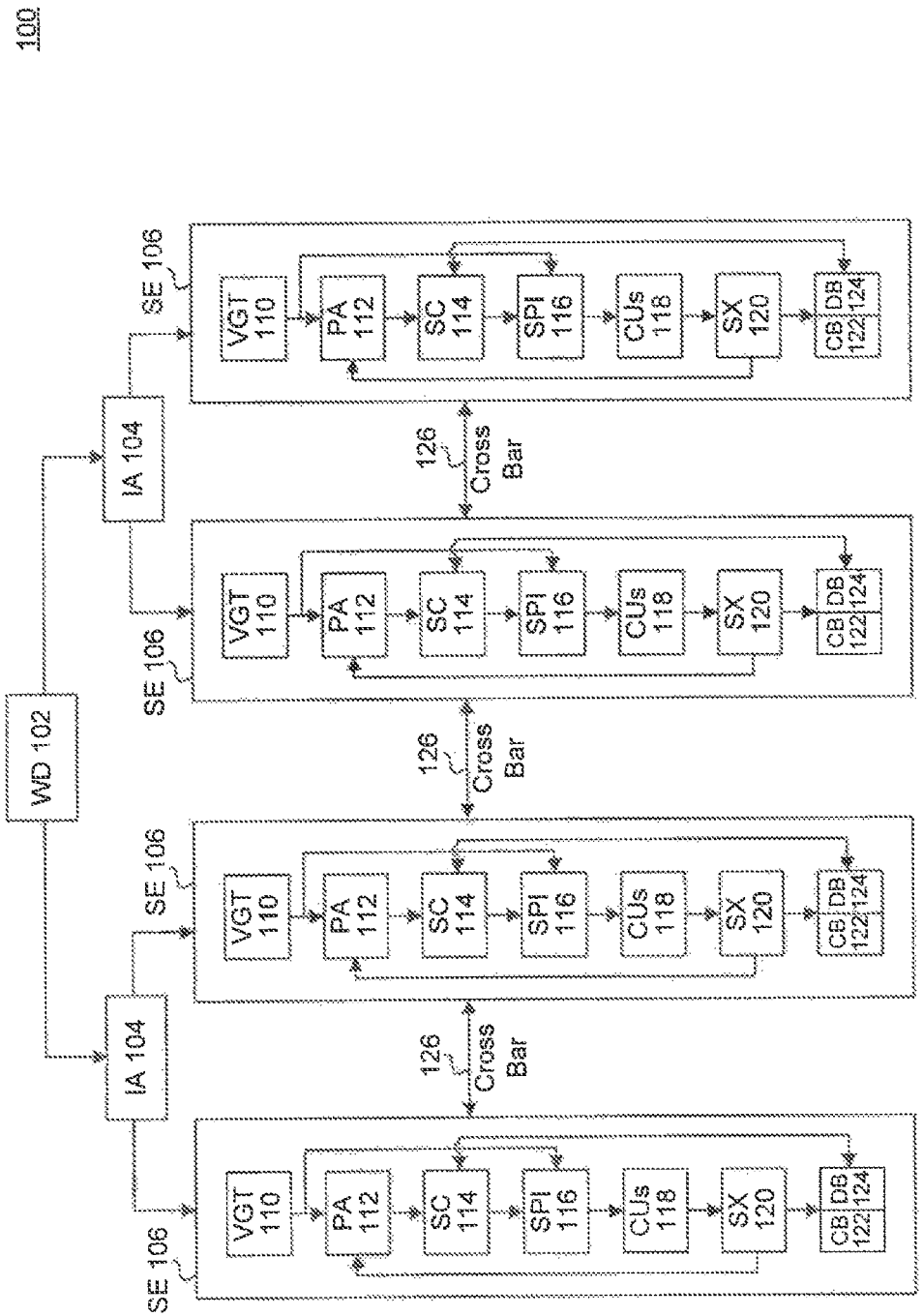
FIG. 1 is a block diagram of a graphics pipeline, according to an embodiment.

FIG. 1 is a block diagram 100 of a graphics pipeline, according to an embodiment. In one example, graphics pipeline 100 includes a work distributor 102, an input assembler (IA) 104, and a shader engine (SE) 106. In one example, each SE 106 includes at least a vertex group tessellator 110 (referred to as VGT 110), a primitive assembler 112 (referred to as PA 112), a scan converter 114 (referred to as SC 114), a shader pipe input 116 (referred to as SFI 116), a shader export unit 120 (referred to as SX 120), a color buffer 122 (referred to as CB 122), and a depth buffer 124 (referred to as DB 124). Information and data may be transmitted between first and second SE 106 via a cross bar 126. Additionally, the graphics pipeline in the example shown in block diagram 100 includes WD 102. In one example, WD 102 distributes the work to other components in a graphics pipeline for parallel processing. WD 102 may also receive a draw call from a driver to render primitives on a display screen. The driver receives the draw call from a graphics application that renders images of a display screen. The driver then uses a communication interface, such as a communication bus, to transmit the draw calls to a graphics pipeline that begins with WD 102. WD 102 divides each draw call into multiple workgroups that are processed in parallel by multiple SEs 106, described below. Each workgroup includes prim groups that can be processed by a single SE 106. A prim group includes a number of primitives that SE 106 processes in one clock cycle.

In this example, to transmit workgroups to shader engines 106, WD 102 passes workgroups to input assemblers 104. In an embodiment, there may be multiple IAs 104 connected to WD 102. This allows WD 102 to distribute as many workgroups to IAs 104 as there are IAs 104 to process multiple workgroup in a single clock cycle. IAs 104 divide workgroups into prim group and pass prim groups to SEs 106.

Each IA 104 is coupled to two SEs 106, although the invention is not limited to this embodiment. When IA 104 is coupled to two SEs 106, each SE 106 receives a prim group that is processed in a single clock cycle. For example, the architecture in FIG. 1 processes four prim groups per clock cycle.

If another IA 104 is added to the graphics pipeline (not shown), the graphics pipeline may process six prim groups per clock cycle. If two IAs 104 are added to the graphics pipeline, the graphics pipeline may process eight prim groups per clock cycle. This configuration allows the graphics pipeline through, in part, WD 102, to scale the number of workgroups to the number of IAs 104 that are included in the graphics pipeline. As understood by those of ordinary skill in the art, the number of IAs 104 and/or SEs 106 that may be operational in a graphics pipeline may change between design and manufacture and, also, during operation. For example, a design having "n" IAs or "m" SEs may, due to manufacturing defects, result in a manufactured device having less than "n" IAs (or less than "m" SEs) operational in a final product. Additionally, during operation, it may be desirable to reserve certain IAs 104 and/or SEs 106 for different operations or to disable (permanently or temporarily, via various techniques including power management techniques, fusing, etc.) certain IAs 104 and/or SEs 106. As a consequence of the embodiments described herein, graphics pipelines can be scaled to process more or less primitives in parallel in a static or dynamic fashion. Accordingly, both power and performance of a graphics pipeline embodying aspects of the present invention can be scaled upwards or downwards effectively.

In another embodiment, WD 102 may distribute prim groups directly to SEs 106. In this embodiment, the functionality of IA 104 may be included in WD 102 or in SE 106. In this case, WD 102 divides a draw call into multiple prim groups and passes a prim group to SE 106 for processing. This configuration allows WD 102 to scale the number of prim groups to the number of SEs 106 that are included in the graphics pipeline.

In the example shown, VGT 110 receives prim groups that include primitives from IA 104. VGT 110 performs a vertex reuse operation on the primitives. The vertex reuse operation converts primitives to unique vertices. A person skilled in the art will appreciate that unique vertices include non-repeating vertices that require processing by SE 106. For example, there are four vertices that comprise a rectangle. When the rectangle is divided into two triangles, each triangle comprises three vertices, for the total of six vertices. However, four out of six of those vertices are unique vertices. By processing only the unique vertices, VGT 110 reduces the number of vertices that require processing.

In this example, PA 112 receives the processed unique vertices, and reassembles the vertices into triangles. Additionally, PA 112 can perform clipping, flipping and set-up tests on the reassembled triangle. PA 112 may also generate equations and data associated with the reassembled triangles for SC 114.

In one example, SC 114 receives equations and data from PA 112. Based on the equations and data SC 114 determines the x, y, and z coordinate position of each vertex in the triangle on the display screen (also referred to as "screen space") of the electronic device. Based on the position and the z coordinate, SC 114 also determines which triangles in the screen space are in front, behind or overlap with other triangles. SC 114 also rasterizes each triangle by identifying the pixels in the screen space that are covered by the triangle. When SC 114 completes rasterization of each triangle, SC 114 organizes the pixels for each triangle into wavefronts and transmits the wavefronts to SPI 116.

In one example, SPI 116 associates wavefronts with a particular shader program. A person skilled in the art will appreciate that a shader program is written by an application developer, in, for example, OpenGL or Direct 3D ("D3D"). The shader program provides instructions to compute unit 118 (refered to as CU 118) to processes wavefronts on the per pixel basis. Example shader programs are a local shader and a hull shader. A local shader manipulates a position, texture, coordinates, and color of each vertex in a triangle. A hull shader computes color and attributes such as light, shadows, specular highlights, translucency, etc., for each pixel in a triangle. In an embodiment, SPI 116 is coupled to multiple CUs 118 and identifies a particular CU 118 which will process a particular wavefront.

CU 118 may process wavefronts using the associated shader programs. CU 118 may also include arithmetic logic units (ALU's) that manipulate wavefronts based on instructions provided in the shader programs.

SX 120 may export data that is calculated by CU 118. Data may be exported back to PA 112, or to CB 122 and/or DB 124.

CB 122 may perform color tests and color blending operations on each pixel or fragment in a triangle. DB 124 may perform depth test operations for each pixel or fragment in a triangle. For example, when two triangles are drawn with the first triangle being in front of the second triangle in the 3D space, DB 124 performs a depth test such that the first triangle is displayed in front of the second triangle in the screen space. The processed pixels are then rendered in screen space and form an image.

In one example, crossbars 126 switch work between SEs 106. For example, the screen space may be divided into a number of blocks, such as, a checkboard pattern. SC 114 in each SE 106 is configured to process pixels that are associated with a particular block in the pattern. However, the block that each pixel belongs to is determined in SE 106 by PA 112 which is after WD 102 distributes the prim group to SE 106. This causes SE 106 to potentially process pixels from the block that is not configured for processing by SC 114 within SF 106. When PA 112 determines that it includes pixel from a block that is processed by SC 114 from another SE 106, PA 112 uses crossbar 126 to pass the pixel data and instructions to SC 114 that is configured to processes pixels in that block.

Figure 2:
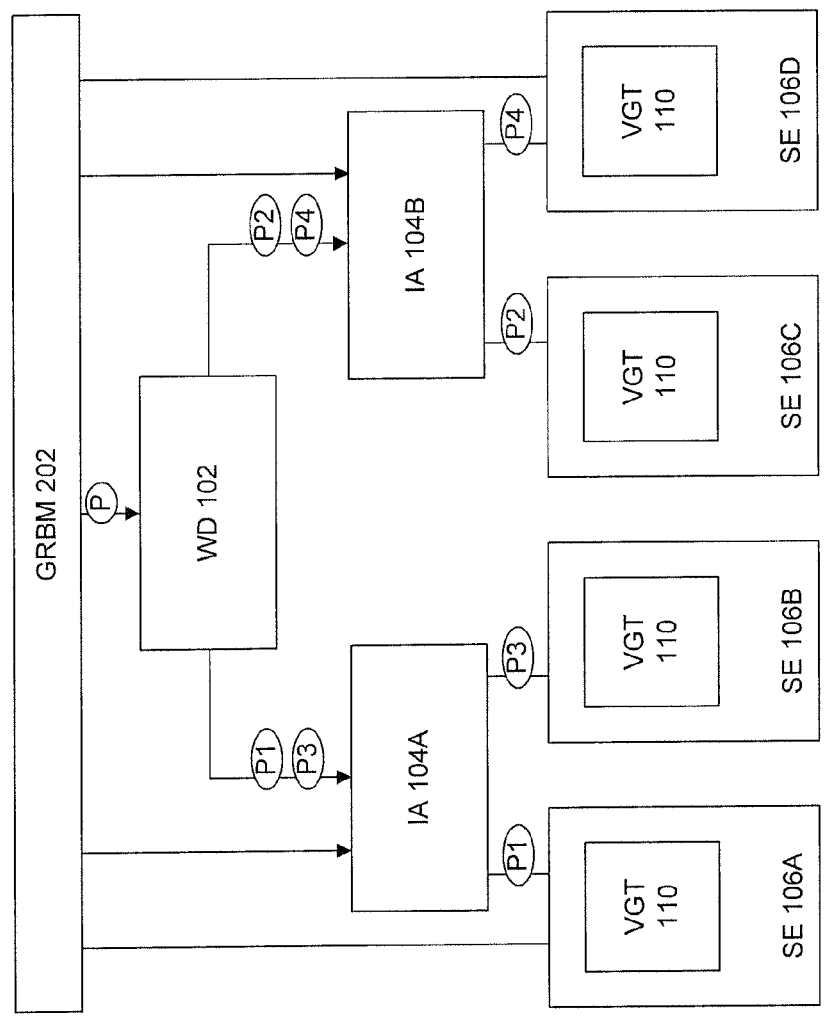
FIG. 2 is a block diagram of a work distributor dividing draw calls into workgroups, according to an embodiment.

FIG. 2 is a block diagram 200 of a work distributor dividing draw calls into workgroups and prim groups, according to an embodiment.

In this example, block diagram 200 includes a graphics register bus manager 202 (also referred to as GRBM 202). GRBM 202 is a bus that receives commands and data that requires processing by various components in a hardware environment. Each piece of hardware connected to GRBM 202 is configured to identify and receive packets that include, for example, commands and data from GRBM 202.

For simplicity, block diagram 200 includes two IAs 104, such as IA 104A and IA 104B, although any number of IAs 104 may be connected to WD 102. Each IA 104 connects to two SEs 106. For example, IA 104A connects to SE 106A and SE 106B, and IA 104B connects to SE 106C and SE 106D.

In one example, when WD 102 receives draw calls that include draw calls from GRBM 202, it determines the processing of each draw call. In one embodiment, WD 102 may send an entire draw call to IA 104A or IA 104B. For example, draw calls that require processing on a single IA 104 are passed to IA 104 as a single workgroup. Those draw calls may require extra indices that are not available until after the draw call is split into multiple prim groups. WD 102 therefore does not split those draw calls into multiple prim groups, but rather processes the draw calls using a single IA 104 or SE 106. Example draw calls that require processing by a single IA 104 are draw calls that contain reset indices.

In another embodiment, WD 102 divides a draw call into multiple workgroups and transmits the workgroups to IA 104A and IA 104B. For example, WD 102 may divide draw call P into two workgroups, where the first workgroup includes prim groups P1 and P3, and the second workgroup includes prim groups P2 and P4. WD 102 may then transmits prim groups P1 and P3 to IA 104A and P2 and P4 to IA 104B.

In an embodiment, WD 102 determines whether to transmit a draw call as a single draw call or multiple workgroups based on one or more register fields that are included in the draw call. The register fields may indicate whether WD 102 can divide a draw call request into multiple prim groups or transmit the entire draw call request to IA 104. On a more granular level, draw call request also includes a register that indicates to IA 104 whether to transmit the draw call to one or more SEs 106.

In an embodiment, WD 102 determines the number of prim groups based on the workgroup size. The workgroup size is programmable by a driver associated with WD 102.

In one example, when IAs 104 receive workgroups they extract the prim groups and transmit the prim groups to SEs 106 for processing. The architecture in the block diagram 200 allows WD 102 to distribute two workgroups, that each include two prim groups to IA 104A and 104B. This allows SEs 106A-D to process four prim groups in parallel in a single clock cycle. However, more prim groups may be processed in parallel per clock cycle when more IAs 104 are coupled to WD 102. In an embodiment, where SEs 106 are connected to WD 102, more prim groups may be processed in parallel per clock cycle when more SEs 106 are coupled to WD 102.

Figure 3:
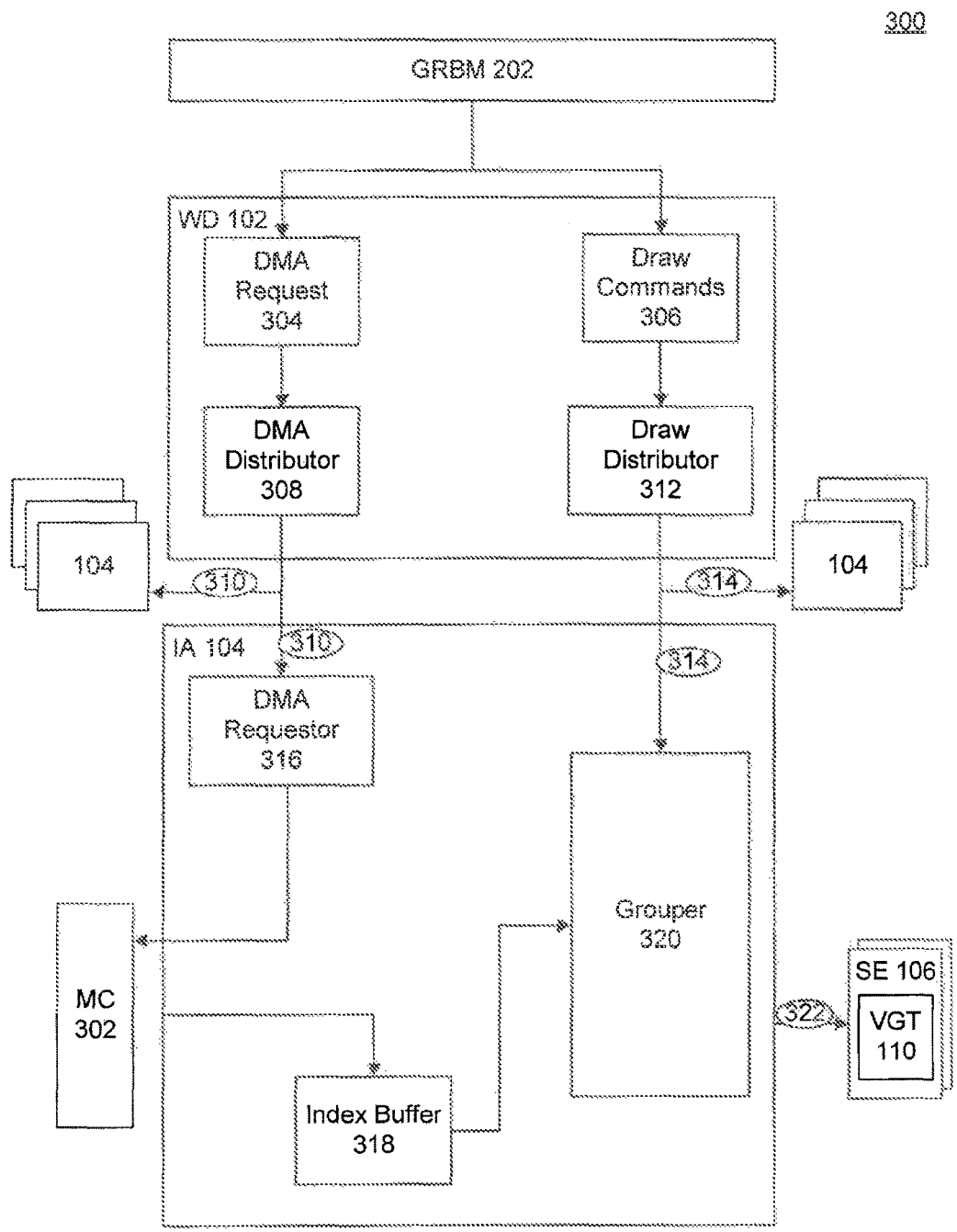
FIG. 3 is a block diagram of a work distributor distributing a workgroup to an input assembler, according to an embodiment.

FIG. 3 is a block diagram 300 of a work distributor distributing a workgroup to an input assembler, according to an embodiment. In this example, block diagram 300 includes GRBM 202, WD 102, IA 104 and a memory controller 302.

In one example, memory controller 302 is a digital circuit that manages the flow of data to and from memory storage of the electronic device. Because GPU is a memory intensive processor, an electronic device that hosts a GPU typically includes large amount of memory storage. Memory storage on an electronic device may include volatile and non-volatile memory for storing data. Volatile and non-volatile memory may be located within a chip that hosts the GPU or elsewhere within the electronic device. Example volatile memory includes a random access memory (RAM). Volatile memory typically stores data as long as electronic device receives power, and may lose its memory state when the power is lost. Example non-volatile memory includes read-only memory, flash memory, ferroelectric RAM (F-RAM), hard disks, floppy disks, magnetic tape, optical discs, etc. Non-volatile memory retains its memory state when the electronic device loses power or is turned off. In an embodiment, data in the non-volatile memory may be copied to the volatile memory prior to being accessed by the GPU.

Memory controller 302 may be integrated within a GPU on the electronic device to reduce memory latency when a GPU stores and retrieves data.

In one example, WD 102 divides draw calls that it receives from GRBM 202 into prim groups. The number of prim groups depend on the prim group size. A prim group size is based on a number of VGT 110 and a type of workload. Prim groups comprise a workgroup. For example, a workgroup size per IA 104 may be calculated as 2*prim group size when each IA 104 is coupled to two VGTs 110. In the architecture described in block diagram 200, WD 102 distributes workgroups to each IA 104. As 104 then distribute prim groups in each workgroup to each SE 106.

Draw calls may be of several types. Draw calls may include a DMA index draw calls. DMA index draw calls include a DMA request 304 and a draw command 306. DMA request 304 use memory controller 302 to retrieve data that requires processing from a memory storage. Draw command 306 includes instructions that manipulate data that the DMA requests retrieve from memory.

In this example, WD 102 receives DMA request 304 and draw command 306 from GRBM 202. WD 102 includes DMA distributor 308 to process DMA requests 304. DMA distributor 308 divides DMA request 304 into DMA request workgroups 310 and distributes each DMA request workgroup 310 to IA 104. DMA distributor 308 typically distributes DMA request workgroups 310 to as many IAs 104 as a number of IAs 104 coupled to WD 102 to balance the processing load on IAs 104.

In one example, WD 102 includes draw distributor 312 to process draw commands 306. Draw commands 306 include instructions for processing data fetched used DMA request workgroup 310. Draw distributor 312 divides draw commands 306 into multiple draw workgroups 314. Draw distributor 312 then distributes draw workgroups 314 to multiple IAs 104.

In an embodiment, WD 102 transmits DMA request workgroups 310 that retrieve data from memory controller 302 to the same IA 104 that receives the corresponding DMA draw workgroups 310.

In one example, IA 104 includes a DMA requestor 316. DMA requestor 316 receives DMA request workgroups 310. Once received DMA requestor 316 uses DMA request workgroups 310 to request data using memory controller 302. Upon receiving the request, memory controller 302 retrieves the requested data from a on-chip or off-chip memory storage and stores the retrieved data in an index buffer 318. Index buffer 318 is an on-chip memory storage buffer, located on a GPU, that may be implemented using a FIFO (first-in, first-out) methodology. The invention, however, is not limited to this embodiment.

In one example, a grouper 320 associates the data in index buffer 318 that was retrieved using DMA request workgroups 310 with the corresponding draw command workgroups 314. Grouper 320 may be located within IA 104, as shown in FIG. 3, although the invention is not limited to this embodiment. Grouper 320 retrieves data from index buffer 318. In an embodiment, grouper 320 uses a list of indices to retrieve data from index buffer 318. Each list of indices may correspond to a particular prim group 322. Once retrieved, grouper 320 combines the data from index buffer 318 with the corresponding draw command workgroups 314 into prim group 322. Prim group 322 is then transmitted to VGT 110 located in one of SEs 106 that are coupled to IA 104.

Another type of a draw call is an auto index draw call. Auto index draw call includes draw command 306, but not DMA request 304. Draw command 306 of the auto index draw call is forwarded to draw distributor 312. Draw distributor 312 then splits draw commands 306 into draw command workgroups 314 and forwards each draw command workgroup 314 to a respective IA 104. Additionally, WD 102 transmits an index offset for each draw command workgroup 314. The index offset allows grouper 320 to generate an auto index for a portion of the draw call that is included in draw command workgroup 314.

Because DMA request 304 may not be included in the auto index draw call, DMA distributor 308 and DMA requester 316 may not be utilized during the processing of the auto index draw call. In order to synchronize DMA distributor 308 and DMA requester 316 with draw distributor 312 and grouper 320, WD 102 or another component in the graphics pipeline generates a dummy DMA fetch command that is processed by DMA distributor 308 and DMA requester 316 when the auto index draw call is processed.

FIG. 4 is an exemplary interface 400 for processing a draw command workgroup. For example, the interface includes bits that are set by draw distributor 312 when draw distributor 312 generates draw command workgroup 314. Grouper 320 can then use the bits to process draw command workgroup 314 and form prim groups 322.

FIG. 5 is another exemplary interface 500 for processing a DMA request workgroup. For example, the interface includes bits that are set by DMA distributor 308 when DMA distributor 308 generates DMA request workgroups 310. DMA requester 316 then uses the bits to process DMA request workgroups 310 to retrieve data using memory controller 302.

FIG. 6 is a flowchart of a method 600 for processing draw calls, according to an embodiment. For example, method 600 may be performed using one or more or systems in FIGS. 1-5 above, which are referred to below merely for convenience and not for limitation. It is to be appreciated that method 600 may not be performed in the order shown, or require all operations shown At operation 602, a number and size of prim groups that may be processed in parallel are determined. For example, the number of SEs 106 may determine the number of prim groups that may be processed in parallel in a single clock cycle. The driver associated with the graphics pipeline may also be preconfigured to store the size of each prim group. This architecture allows WD 102 to scale the number of prim groups to the number of SEs 106 that are included in the graphics pipeline.

At operation 604, a draw call is divided into workgroups. For example, work distributor 102 divides a draw call into multiple workgroups. Work distributor 102 divides the draw call according to a draw call type. Moreover, work distributor 102 uses DMA distributor 308 and draw distributor 312 to generate DMA request workgroups 310 and draw command workgroups 314 from DMA requests 304 and draw commands 306 respectively.

At operation 606, each workgroup is distributed for processing. For example, workgroups are distributed to IA 104 where each workgroup is further divided into prim groups 322 for processing by VGTs 110. As part of the workgroup processing, DMA requester 316 uses DMA request workgroup 308 to retrieve data from memory controller 302. Grouper 320 then generates prim group 322 by combining the portion of the retrieved data with the associated portion of a draw command, and transmits prim group 322 to VGT 210.

Embodiments of the claimed invention can be accomplished, for example, through the use of general-programming languages (such as C or C++), hardware-description languages (HDL) including Verilog HDL, VHDL, Altera HDL (AHDL) and so on, a programmable shader running, as a pre-process to a GPU, or other available programming and/or schematic-capture tools (such as circuit-capture tools). The program code can be disposed in any known computer-readable medium including semiconductor, magnetic disk, or optical disk (such as CD-ROM, DVD-ROM). As such, the code can be transmitted over communication networks including the Internet and internets. It is understood that the functions accomplished and/or structure provided by the systems and techniques described above can be represented in a core (such as a CPU core and/or a GPU core) that is embodied in program code and may be transformed to hardware as part of the production of integrated circuits.

In this document, the terms "computer program medium" and "computer-usable medium" are used to generally refer to media such as a removable storage unit or a hard disk drive. Computer program medium and computer-usable medium can also refer to memories, such as system memory and graphics memory which can be memory semiconductors (e.g., DRAMs, etc.). These computer program products are means for providing software to an APD.

The invention is also directed to computer program products comprising software stored on any computer-usable medium. Such software, when executed in one or more data processing devices, causes a data processing device(s) to operate as described herein or, as noted above, allows for the synthesis and/or manufacture of computing devices (e.g., ASICs, or processors) to perform embodiments of the present invention described herein. Embodiments of the invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage devices, etc.), and communication mediums (e.g., wired and wireless communications networks, local area networks, wide area networks, intranets, etc).

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system comprising:
    a plurality of shader engines implemented in computer hardware; and
    a work distributor configured to:
        divide a draw call for processing primitive into a plurality of prim groups according to a prim group size; and
        distribute the plurality of prim groups to the plurality of shader engines for parallel processing of the plurality of prim groups during a clock cycle,
    wherein the size of a prim group and a number of prim groups are scaled to the plurality of shader engines.

2. The system of claim 1, wherein the plurality of shader engines is dynamic.

3. The system of claim 1, wherein:
    the work distributor is further configured to divide the draw call into a plurality of workgroups, and
    each workgroup in the plurality of workgroups includes at least two prim groups for processing during the clock cycle.

4. The system of claim 1, wherein the draw call includes a request portion and a draw command portion.

5. The system of claim 1, wherein the work distributor further comprises:
    a distributor configured to:
        divide a request portion of the draw call into a plurality of request prim groups, wherein each request prim group retrieves data for processing the primitives in the draw call; and
        route each request prim group to a requestor to retrieve the data associated with the request prim group; and
    a draw distributor configured to:
        divide a draw command portion of the draw call into a plurality of draw command prim groups, wherein each draw command prim group includes instructions for processing the data, and corresponds to the request prim group; and
        route each draw command prim group to a grouper to process the data retrieved using the corresponding request prim group.

6. The system of claim 5, wherein:
    the distributor is further configured to divide the request portion into a plurality of request workgroups, each request workgroup including two request prim groups to route to the requestor; and
    the draw distributor is further configured to divide the draw command into a plurality of draw command workgroups, each draw command workgroup including two draw command prim groups for routing to the grouper, wherein each request workgroup corresponds to the draw command workgroup.

7. The system of claim 5, further comprising a memory controller configured to:
    retrieve the data for each request prim group from a memory storage; and
    prepare the retrieved data for processing using the corresponding draw command prim group.

8. The system of claim 1, wherein the work distributor is further configured to:
    identify the draw call that is not divisible into multiple prim groups; and
    route the draw call as a single prim group for processing the primitives in the draw call.

9. The system of claim 1, wherein the work distributor is further configured to generate a dummy request for the draw call that is not divisible into multiple prim groups.

10. The system of claim 1, wherein a size of each prim group is programmable using a graphics driver.

11. A method comprising:
    determining a size of a prim group and a number of prim groups, wherein the determining is based, at least in part, on a plurality of shader engines implemented in hardware;
    dividing a draw call for processing primitives into a plurality of prim groups according to the size of the prim group; and
    distributing the plurality of prim groups to a plurality of shader engines for parallel processing of the plurality of prim groups during a clock cycle.

12. The method of claim 11, further comprising:
dividing the draw call into a plurality of workgroups, wherein each workgroup includes at least two prim groups for processing during the clock cycle.

13. The method of claim 11, wherein the draw call includes a request portion and a draw command portion.

14. The method of claim 11, wherein the dividing further comprises:
dividing a request portion of the draw call into a plurality of request prim groups, wherein each request prim group retrieves data for processing primitives in the draw call;
routing each request prim group to a requestor to retrieve the data associated with the request prim group;
dividing a draw command portion of the draw call into a plurality of draw command prim groups, wherein each draw command prim group includes instructions for processing the data, and corresponds to the request prim group; and
routing each draw command prim group to a grouper to process the data retrieved using the corresponding request prim group.

15. The method of claim 13, wherein the dividing further comprises:
dividing the request portion into a plurality of request workgroups, each request workgroup including two request prim groups to route to the requestor; and
dividing the draw command into a plurality of draw command workgroups, each draw command workgroup including two draw command prim groups for routing to the grouper, wherein each request workgroup corresponds to the draw command workgroup.

16. The method of claim 14, further comprising:
retrieving the data for each request prim group from a memory storage; and
preparing the retrieved data for processing using the corresponding draw command prim group.

17. The method of claim 12, further comprising:
identifying the draw call that is not divisible into multiple prim groups; and
routing the draw call as a single prim group for processing the primitives in the draw call.

18. The system of claim 15, further comprising:
generating a dummy request for the draw call that is not divisible into multiple prim groups.

19. The method of claim 11, wherein a size of each prim group is programmable using a graphics driver.

20. The method of claim 11, wherein the plurality of shader engines is dynamic.

21. A non-transitory computer-readable medium having instructions stored thereon, that when executed by the computing device, cause the computing device to perform operations, comprising:
dividing a draw call for processing primitives into a plurality of prim groups according to a prim group size;
distributing the plurality of prim groups to a plurality of shader engines for parallel processing of the plurality of prim groups during a clock cycle, wherein the plurality of shaders are implemented in hardware; and
scaling the size of a prim group and a number of prim groups based on the plurality of shader engines.

22. The computer-readable medium of claim 21, further comprising:
dividing the draw call into a plurality of workgroups, wherein each workgroup includes at least two prim groups for processing during the clock cycle.

23. The computer-readable medium of claim 21, when the operation that cause the computing device to divide the draw call, further include operations comprising:
dividing a request portion of the draw call into a plurality of request prim groups, wherein each request prim group retrieves data for processing primitives in the draw call;
routing each request prim group to a requestor to retrieve the data associated with the request prim group;
dividing a draw command portion of the draw call into a plurality of draw command prim groups, wherein each draw command prim group includes instructions for processing the data, and corresponds to the request prim group; and
routing each draw command prim group to a grouper to process the data retrieved using the corresponding request prim group.

\* \* \* \* \*